(12) United States Patent
Greenwood et al.

(10) Patent No.: US 7,318,786 B2
(45) Date of Patent: Jan. 15, 2008

(54) HYDRAULIC CONTROL CIRCUIT FOR A VARIATOR

(75) Inventors: Christopher John Greenwood, Preston (GB); John William Edward Fuller, Preston (GB)

(73) Assignee: Torotrak (Development) Limited (GB)

( * ) Notice: Subject to any disclaimer, the term of this patent is extended or adjusted under 35 U.S.C. 154(b) by 737 days.

(21) Appl. No.: 10/473,109

(22) PCT Filed: Apr. 2, 2002

(86) PCT No.: PCT/GB02/01551

§ 371 (c)(1),
(2), (4) Date: Apr. 21, 2004

(87) PCT Pub. No.: WO02/079675

PCT Pub. Date: Oct. 10, 2002

(65) Prior Publication Data

US 2004/0171456 A1    Sep. 2, 2004

(30) Foreign Application Priority Data

Mar. 29, 2001 (GB) ............................... 0107823.7
Oct. 26, 2001 (GB) ............................... 0125733.6

(51) Int. Cl.
*F16H 1/00* (2006.01)
(52) U.S. Cl. .................... 476/10; 476/2; 476/40
(58) Field of Classification Search .............. 476/2, 476/9, 10, 40
See application file for complete search history.

(56) References Cited

U.S. PATENT DOCUMENTS 3,142,190 A * 7/1964 Kelsey et al. ............... 476/10
4,229,986 A * 10/1980 Sharpe ......................... 476/65

(Continued)

FOREIGN PATENT DOCUMENTS

EP    0 006 690 A    1/1980

(Continued)

OTHER PUBLICATIONS

International Preliminary Examination Report, PCT/GB02/01551, Oct. 24, 2002.

(Continued)

*Primary Examiner*—David M. Fenstermacher
(74) *Attorney, Agent, or Firm*—Brooks Kushman P.C.

(57) ABSTRACT

A variator assembly comprising a variator of the toroidal-race rolling-traction type. The assembly has input and output discs and rollers which are acted on by hydraulic roller control actuators. They are positioned between the discs to transmit torque from one disc to the other. Hydraulic end loading means supplied with fluid at an end load pressure to apply an end load to bias the discs and the rollers toward each other, thereby enabling the transmission of torque. Reaction pressure supply means are connected to the roller control actuators to cause them to apply an adjustable reaction force to the rollers. The assembly also has hydraulically influenced valve means which serve to compare an input related to the end load pressure with an input related to the reaction pressure and to control the end load pressure in dependence upon the comparison, thereby maintaining a relationship between the end load and reaction pressures. Adjustment means are provided to adjust the relationship between the end load and reaction pressures.

15 Claims, 11 Drawing Sheets

U.S. PATENT DOCUMENTS 4,713,978 A * 12/1987 Perry .......................... 476/9
6,030,310 A     2/2000 Greenwood
6,113,513 A     9/2000 Itoh
6,162,144 A    12/2000 Haka

FOREIGN PATENT DOCUMENTS

EP     0 380 933 A    8/1990
GB     2 023 753 A    1/1980

OTHER PUBLICATIONS

International Search Report, PCT/GB 02/01551, Aug. 8, 2002.

* cited by examiner

HYDRAULIC CONTROL CIRCUIT FOR A VARIATOR

BACKGROUND OF THE INVENTION

1. Field of the Invention

The present invention relates to a hydraulic circuit for controlling a continuously variable ratio unit ("variator") of the toroidal-race rolling-traction type, and more particularly for controlling an end load in such a variator.

2. Background Art

Toroidal-race rolling-traction type variators are in themselves well known. One, or more typically two, toroidal or part toroidal cavities are defined by opposed faces of rotatably, coaxially mounted discs and drive is transmitted between the discs by rollers disposed in the cavities. It is well known in such variators to mount each roller in a carriage and to connect that carriage to a piston subject to a controlled hydraulic force. So-called "torque control" operation can be achieved in well known manner by applying the hydraulic force along a generally tangential direction (with respect to the axis of the variator discs) and allowing the roller/carriage to move along a circular path centred on the axis. The roller is permitted to precess (that is, the roller axis can rotate) and as is well known the roller precesses such that its axis always intersects the disc axis. Consequently when the roller moves along its circular path it also precesses and the change in roller inclination produces a change in variator transmission ratio. The roller adopts a position in which the force applied thereto by the piston is balanced by an opposite, "reaction", force produced (by shear of a film of so-called "traction fluid") at the interfaces between the roller and its neighbouring discs. The torque transmitted by the variator is a function of the reaction force. In the steady state the hydraulic and reaction forces balance.

In order to enable transmission of torque by the variator there must be pressure at the roller/disc interfaces and in variators of the "full toroidal" type this is typically provided by means of a hydraulic actuator which acts on one of the variator discs to apply an "end load" biasing the discs toward the rollers. The magnitude of the end load has an important bearing on variator efficiency and performance. It is known to vary the end load during operation. An important parameter in this regard is the traction coefficient. If we define the normal force to be the force exerted by the roller on one of the discs (and of course by the disc on the roller) at the interface therebetween and along the direction normal to this interface, then the traction coefficient $\mu$ is simply the ratio of reaction force (RF) to normal force (NF):

$$\mu = \frac{RF}{NF}$$

Note that the normal force is in the general case not precisely equal to the end load because the normal force acts along a direction perpendicular to the plane of the roller/disc interface, this direction being parallel to the direction of action of the end load only in one particular roller position (corresponding to a 1:1 variator drive ratio). In the general case, the end load and normal force are related through the cosine of the roller angle.

An excessively low traction coefficient, corresponding to an unnecessarily high end load and hence high normal force, gives rise to large energy losses at the roller/disc interface and so is inefficient. An excessively high traction coefficient is also inefficient in energy terms and can lead to variator failure, excessive slip at the roller/disc interface allowing the roller to move, rapidly in some situations, away from its proper position. It is necessary to guard against this eventuality.

In so called "full toroidal" variators, energy losses at the roller/disc interface can be considered in terms of (1) slip and (2) spin. Slip involves relative motion, along the circumferential direction, of the roller/disc surfaces at their interface, corresponding to a mismatch in rotational speeds of the roller and disc. Slip losses increase as the degree of slip increases. Spin involves relative angular motion of the two surfaces at the roller/disc interface. It arises from the geometry of the variator and the degree of spin is determined by this geometry, the roller positions and the variator speed. However energy losses due to spin are affected by the magnitude of the normal force and hence are related to the traction coefficient. It is found that the curve representing variation of efficiency with traction coefficient has a peak representing the best compromise between spin and slip losses. This must be taken into account in order to operate the variator at optimal efficiency.

A known hydraulic circuit for controlling the variator uses a pair of hydraulic lines to supply hydraulic fluid at adjustable pressures to opposite sides of the roller control pistons, thus enabling the reaction force to be varied. In order to provide for adjustment of end load, a valve arrangement of "higher pressure wins" type is used to supply fluid from whichever of the lines is at higher pressure to a working chamber of a hydraulic end load actuator and in this way a relationship is created between the reaction force and the normal force (or, to be strictly accurate in view of the cosine variation of normal force with roller angle referred to above, between the reaction force and the end load). One such arrangement is described in the applicant's earlier European Patent EPO894210 and in its US counterpart U.S. Pat. No. 6,030,310 which disclosed in detail a practical end loading arrangement and the contents of which are incorporated herein by reference for purposes of US law. In that arrangement the end load actuator actually has two working chambers, one supplied with pressure from the higher pressure line to apply the end load and one supplied from the lower pressure line to produce an opposed force which reduces the end load. In such an arrangement the traction coefficient can in effect be pre-set by appropriate choice of piston areas, particularly in the end load actuator.

The hydraulic coupling of the end load to the roller control actuators makes it possible to vary the end load rapidly in sympathy with the reaction force. This hydraulic coupling is highly advantageous because variators in motor vehicle transmissions are subject in practice to rapid and severe "torque spikes", eg. upon braking, and to provide adequate end load on demand to accommodate such spikes (and avoid variator failure due to the traction coefficient increasing excessively) requires correspondingly rapid end load adjustment. In the arrangement described above, occurrence of a torque spike results in a corresponding pressure increase in the higher pressure line which is automatically and rapidly passed on to the end load actuator by the hydraulics.

However such systems are subject to problems. In some arrangements poor pressure response, in particular a time lag in matching the variator end load to the roller reaction force, has been found to occur. Unavoidably, compliance in the variator and its hydraulics mean that a finite volume of fluid is required to effect a change in end load. Flow is absorbed, eg. by flexure of the end load actuator components. In conjunction with flow restrictions in the hydraulics, the result can be a significant time lag between the reaction pressure and the end load pressure and hence a transient mismatch between the end load and reaction forces. The mismatch occurs during rapid changes in reaction force as in the event of transient torque spikes. In extreme cases there is an associated risk of variator failure.

It should be noted that EP0894210 suggests an arrangement in which a hydraulically controlled valve is used to control the end load pressure. This valve has a spool which is influenced by the end load pressure itself and also by mutually opposed pressures from opposite sides of the variator's double acting roller control pistons. The spool's position is determined by the balance between these three signals. The end load actuator is normally connected to a pump supplying pressurised fluid and the valve controls a drain from the end load actuator so that in response to excess end load pressure the drain is opened and the pressure is reduced. The arrangement is intended to maintain the traction coefficient at a constant level and there is no provision for adjustment of the traction coefficient.

It is desirable to provide for controlled adjustment of the traction coefficient, to make possible increased efficiency and to take account of variable factors such as the temperature of the variator traction fluid. Following start up the traction fluid, initially cold, is progressively warmed and its characteristics are consequently altered. The appropriate traction coefficient is likewise altered and it would be advantageous to carry out corresponding modification of the end load.

This need to adjust the traction coefficient according to temperature has been recognised in prior U.S. Pat. No. 6,162,144, assigned to General Motors Corporation, although the hydraulic circuit used to achieve the adjustment (see FIG. 3 of the patent) simply uses a pulse width modulated valve to feed a percentage of the end load pressure to a second chamber of the end load actuator, working in opposition to the end load pressure, to thereby adjustably reduce the end load. The additional problem of time lag in adjustment of the end load is not addressed. Additionally it is believed that there would be severe difficulties in creating a practical implementation of the circuit proposed in this patent, particularly in providing a pulse width modulated valve capable of carrying out the required function.

It should also be noted that adjustment of the coefficient of traction can be achieved in the type of known hydraulic circuit discussed above, having two hydraulic supply lines feeding opposite sides of the roller control pistons and a higher pressure wins arrangement to feed pressure from one of the lines to the end load actuator, by adjusting the pressures in both lines together to thereby increase or decrease the higher pressure (and hence the end load) without altering the pressure difference between the two lines which determines the reaction force. However this approach does not address the problem of end load time lag and complicates the control of the variator rollers.

SUMMARY OF THE INVENTION

The inventors have recognised that to address the two problems of end load time lag and traction coefficient adjustment requires a dual mode of end load pressure control, not found in the above mentioned prior art.

In accordance with a first aspect of the present invention there is a variator assembly comprising a variator of the toroidal-race rolling-traction type having input and output discs, rollers which are acted on by hydraulic roller control actuators and are positioned between the discs to transmit torque from one disc to the other, hydraulic end loading means supplied with fluid at an end load pressure to apply an end load to bias the discs and the rollers toward each other thereby enabling the transmission of torque, and reaction pressure supply means connected to the roller control actuators to cause them to apply an adjustable reaction force to the rollers, the assembly further comprising hydraulically influenced valve means responsive to the reaction pressure and the end load pressure to control the end load pressure and thereby maintain a relationship between the end load and reaction pressures, and adjustment means to adjust the relationship between the end load and reaction pressures.

In a preferred embodiment the effect of the adjustment means is to reduce the end load pressure so that in the event of inaction of the adjustment means the end load pressure is increased.

Preferably, the valve means serves to compare an input related to the end load pressure with an input related to the reaction pressure and to control the end load pressure in dependence upon the comparison.

In a further preferred embodiment of the present invention the valve means comprise a pilot operated valve receiving a hydraulic reaction pressure input signal taken from a connection to the reaction pressure supply means.

In another preferred embodiment of the present invention the roller control actuators are double acting and are connected to first and second reaction pressure supply means, the pressures from which oppose each other in determining the force applied to the rollers, a further valve arrangement being connected across the first and second supply means to direct the higher of the two pressures to the valve means.

Preferably the valve means is arranged to receive as a further input an end load adjustment signal from the adjustment means and to modify the end load pressure in response thereto.

In one such embodiment the valve means comprises a valve spool and the adjustment means comprises an actuator for applying an adjustable biasing force to the valve spool.

The actuator may be coupled to the valve spool through a spring member.

In a further preferred embodiment the assembly further comprises a pressure modifying arrangement which receives as an input pressure one of the reaction pressure and the end load pressure, which modifies this pressure to create an output pressure which is a function of the input pressure and which applies the output pressure to the valve means.

Preferably the pressure modifying arrangement comprises two restrictors which are connected in series and through which the input pressure is led to a pressure sink, one of the restrictors being variable and the output pressure being taken from between the two restrictors.

The valve means may have at least two states in which it serves to connect the end loading means respectively to (1) a high pressure fluid source and
(2) a pressure sink.

Preferably the valve means has a further state in which it serves to isolate the end loading means.

It is especially preferred that the adjustment means are electronically controlled in dependence upon measured variator operating parameters.

According to a second aspect of the present invention there is a variator assembly comprising a variator of the toroidal-race rolling-traction type having input and output discs, hydraulic piston actuated rollers positioned between said discs and operative to transmit traction therebetween and end loading means for applying hydraulic pressure to bias the discs towards engagement with each other, the assembly further comprising:

(a) means for supplying a reaction circuit pressure which is a function of pressure applied to the roller pistons;

(b) an accumulator containing hydraulic fluid at an accumulator pressure;

(c) pilot valve means switchable between a first position in which it connects the reaction circuit pressure to the end loading means and a second position in which it connects the accumulator to the end loading means, the valve means being biased towards the first position by a force which is a function of the pressure in the end loading means and being biased towards the second position by a force which is a function of the reaction circuit pressure.

According to a third aspect of the present invention there is a variator assembly comprising a variator of the toroidal-race rolling-traction type having input and output discs, hydraulic piston actuated rollers positioned between said discs and operative to transmit traction therebetween and end loading means for applying hydraulic pressure to bias the discs towards engagement with the rollers, the assembly further comprising:

(a) means for supplying a reaction circuit pressure which relates to pressure applied to the roller pistons;

(b) a pressurised fluid source; and (c) pilot valve means switchable between a first position in which it connects the reaction circuit pressure to the end loading means and a second position in which it connects the pressurised fluid source to the end loading means, the valve means being biased towards the first position by a force which is related to the pressure in the end loading means and being biased towards the second position by a force which is related to the reaction circuit pressure.

BRIEF DESCRIPTION OF THE DRAWINGS

Specific embodiments of the present invention will now be described, by way of example only, with reference to the accompanying drawings, in which.

DETAILED DESCRIPTION OF THE PREFERRED EMBODIMENTS

Figure 1:
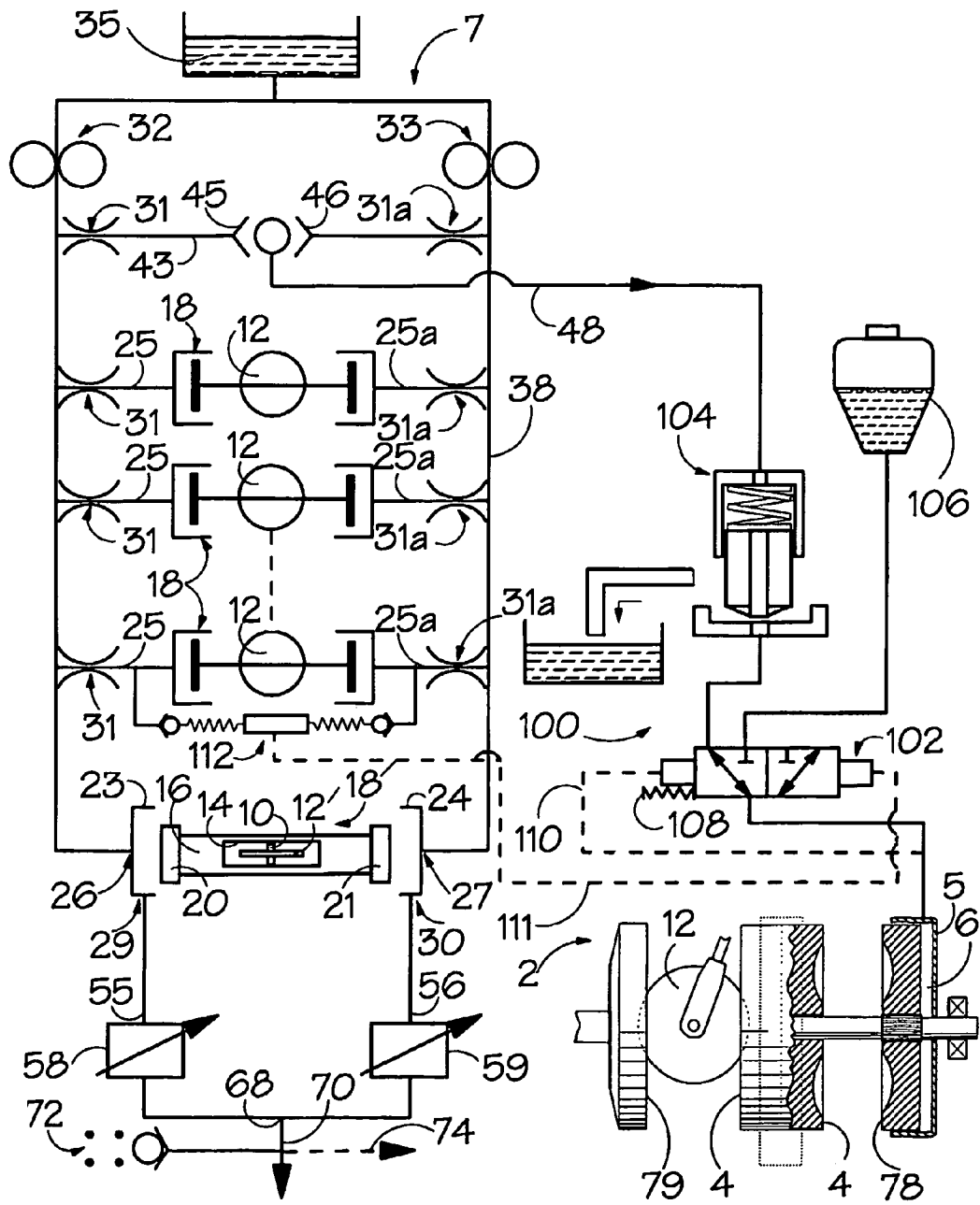
FIG. 1 is a cross sectional view of a variator incorporating a representative, somewhat simplified, form of end load mechanism, together with a schematic representation of a control circuit for the variator, incorporating certain features of the present invention.

A variator 2 schematically illustrated in FIG. 1 comprises a pair of input rotor discs 78,79, an output rotor disc 4 and a plurality of rollers 12 situated therebetween for transmission of torque in a manner well known to those skilled in the art and therefore not described in detail herein. At the end of the variator 2 there is provided an end-load assembly 5 which, in its representative form, comprises a simple hydraulic chamber 6 fed with hydraulic fluid at pressure. The pressure in chamber 6 acts to load disc 78 axially such that it clamps the rollers 12 between the discs 4, 78, 79 and enables transmission of torque across the variator. As mentioned above, the magnitude of the end load is to be adjusted in order to achieve an appropriate traction coefficient.

Turning now to the control circuit 7 of the present embodiment of the invention, it will be appreciated that the axle 10 of a master roller 12' of the variator is mounted in the cavity 14 of a hollow shaft 16 of a double-headed roller carriage piston 18. This piston is formed with opposed piston heads 20, 21 which slide under hydraulic load within coaxial cylindrical caps 23, 24 and which are free to rotate about the axis of shaft 16. In practice a double-acting piston is often preferable, with opposite faces of the single head both exposed to fluid, but the equivalent double-headed piston arrangement represented in the drawing has been used for ease of understanding. In either case, the piston reaction force is dependent on the difference in the hydraulic pressures applied to the two faces of the piston.

Hydraulic fluid inlets 26, 27 and outlets 29, 30 are formed in the end and side walls of caps 23, 24 respectively, and the end caps of a set of slave roller carriage pistons 18 are supplied with fluid by means of a plurality of similar supply branches 25, 25a via restrictors 31, 31a in the supply branches 25, 25a. The pressures acting on the corresponding slave carriage pistons 18 of the remaining rollers are related to those in caps 23, 24 so that at equilibrium the applied reaction forces equate.

The control circuit comprises two sources of hydraulic fluid provided by oil pumps 32, 33 capable of delivering hydraulic fluid from a sump 35 at, for example, between 0 to 50 bar to left-hand and right-hand upstream flow lines 37 and 38 and it is these lines that deliver the fluid respectively to the cylinder inlets 26 and 27 of the master piston 18' and to the slave pistons 18. Such pumps will, however, not provide hydraulic fluid at these pressures unless control valves 58, 59, connected to the respective hydraulic outlets 29,30, are sufficiently restricted. A cross-connection 43 between lines 37 and 38 communicates by way of a "higher-pressure-wins" arrangement of non-return valves 45 and 46, and via a conduit 48, with a further control circuit 100 whose output is connected to the hydraulic chamber 6 of the end-load mechanism 5. This ensures that the further control circuit 100 is always fed with fluid at a pressure whichever of the two pressure lines 37, 38 is of higher pressure (hereinafter referred to as "reaction circuit pressure").

Outlets 29 and 30 from caps 23 and 24 lead by way of downstream left-hand and right-hand lines 55 and 56 to the inlets of the two pressure control valves 58 and 59 which are formed as electro-hydraulic proportional pressure control valves and whose operation is described later herein. Downstream of the control valves 58 and 59, the left and right-hand fluid lines combine at 68 after which a connection 70 is operable to provide fluid for general lubrication of the transmission. This is maintained at the correct back pressure by pressure relief valve 72.

The further control circuit 100 comprises a shuttle valve 102 in the form of a double pilot operated directional control valve having a first inlet port for receipt of the reaction circuit pressure from the "higher-pressure-wins" valve arrangement 45, 46 via an end-load discharge dump valve 104, a second inlet port connected to a high pressure fluid source formed in this embodiment as a hydraulic pressure accumulator 106, and an outlet port connected directly to the hydraulic chamber 6 of the end-load mechanism 5. The discharge dump valve 104 is a flow control valve which allows free flow in the forward direction (i.e. towards the control circuit 100) but which regulates and limits reverse flow back to the reaction circuit in that the valve dumps any excess reverse flow above a predetermined level (e.g. the valve allows a maximum reverse flow of typically 0.5 liters/min and dumps any excess flow).

The shuttle valve 102 is biased by a spring 108 towards the position illustrated in FIG. 1, in which the output of the discharge dump valve 104 is connected to the outlet of the shuttle valve 102 and thence to the hydraulic chamber 6 of the end-load mechanism 5. However, the position of the valve is further determined by two pilot pressures. The first pilot pressure is taken by line 110 directly from the hydraulic chamber 6 of the end-load mechanism 5 and corresponds to the hydraulic pressure existing in the chamber 6 at any time. The second pilot pressure is taken from the higher of the two pressures applied to one of the slave pistons 18, by means of a zero flow shuttle valve 112 via line 111. The valve 112 is actuated by fluid pressure at points between the piston outlets and the flow restrictors 31, 31a, preferably as close as possible to the piston outlets, since these pressures are most representative of the actual pressures existing within the cylinder 18'.

As will be appreciated by those skilled in the art, the valve 112 may be actuated by pressures from opposite sides of two different slave pistons 18, since the pressures applied to the same side of each of the pistons 18 are the same. In the drawing, the pressures are taken from the two ends of the same piston, for ease of reference. Alternatively, the valve 112 may be actuated by pressures from opposite sides of the master piston 18', but this may cause problems if the piston is fitted with a hydraulic end stop mechanism.

The two pilot pressures act in opposite senses on the pilot-operated shuttle valve 102 and thus the shuttle valve 102 serves as a comparator, comparing the higher of the pressures applied to the variator control cylinders with the end-load pressure. Since the shuttle valve 102 reacts to pressures within one of the slave pistons 18 as restricted by the flow restrictors 31, 31a and since the pilot signal from the variator control cylinder requires no flow, the output from the valve 112 is therefore the most accurate indicator of pressure, and therefore reaction force, within the cylinders. In particular, it overcomes the potential of a false indication of pressure resulting from pressure losses (and therefore time lags) which occur when the end-load is being charged and slower pressure rise in the hydraulic chamber 6 of the end-load mechanism 5.

As mentioned above, the shuttle valve 102 has a bias provided by spring 108, such that the end-load pressure must fall below the maximum reaction circuit pressure by an amount in excess of the preloading of the spring 108 (typically in the region of 1 bar) before the shuttle valve moves to its alternative position in which the accumulator 106 is connected to the end-load.

Thus, for situations where the end-load pressure exceeds the reaction circuit pressure, and also where the reaction circuit pressure exceeds the end-load pressure by less than the bias of the spring 108, the shuttle valve will connect the output of the "higher pressure wins" valve arrangement 45, 46 to the chamber 6 of the end-load mechanism 5. This ensures accurate steady state pressure matching of the reaction circuit pressure from the variator and the end-load pressure and makes the system determinate under steady state conditions.

When the end-load pressure falls below the reaction circuit pressure by an amount in excess of the preloading of the spring 108, the pilot-operated shuttle valve 102 moves to its alternative position, connecting the chamber 6 of the end-load assembly 5 to the accumulator 106 (which is typically charged to a pressure of about 50 to 55 bar). The end-load chamber 6 is then charged from the accumulator, but because of the differential area of the spool of the valve 102 at full stroke the end-load must rise above reaction circuit pressure before the valve 102 moves back to connect the end-load chamber 6 to the reaction circuit feed.

In practice, it is found that the shuttle valve 102 tends to shuttle back and forth between its two extreme positions in transient conditions. The valve rarely remains connected to the accumulator for a sufficient length of time for the accumulator pressure to be applied fully to the end load chamber 6, since whenever a different pressure is applied to the end load chamber 6, the pressures controlling the position of the shuttle valve are also changed as a consequence.

The result of the above is that during a transient situation the end-load is applied stepwise as the pilot-operated shuttle valve 102 shuttles back and forth to top up end-load pressure as required. Reaction to transient "spikes" in the reaction pressure is rapid. The system allows the use of small mechanical valves and is therefore very dynamic.

If pressure demand in the end-load assembly drops (as a result of a fall in the pressures applied to the variator control pistons), any excess in the flow (over a predetermined limit) from the end-load chamber 6 is dumped to tank via the end-load dump valve 104 rather than flowing back into the reaction circuit, thereby ensuring good pressure-off times.

Figure 2:
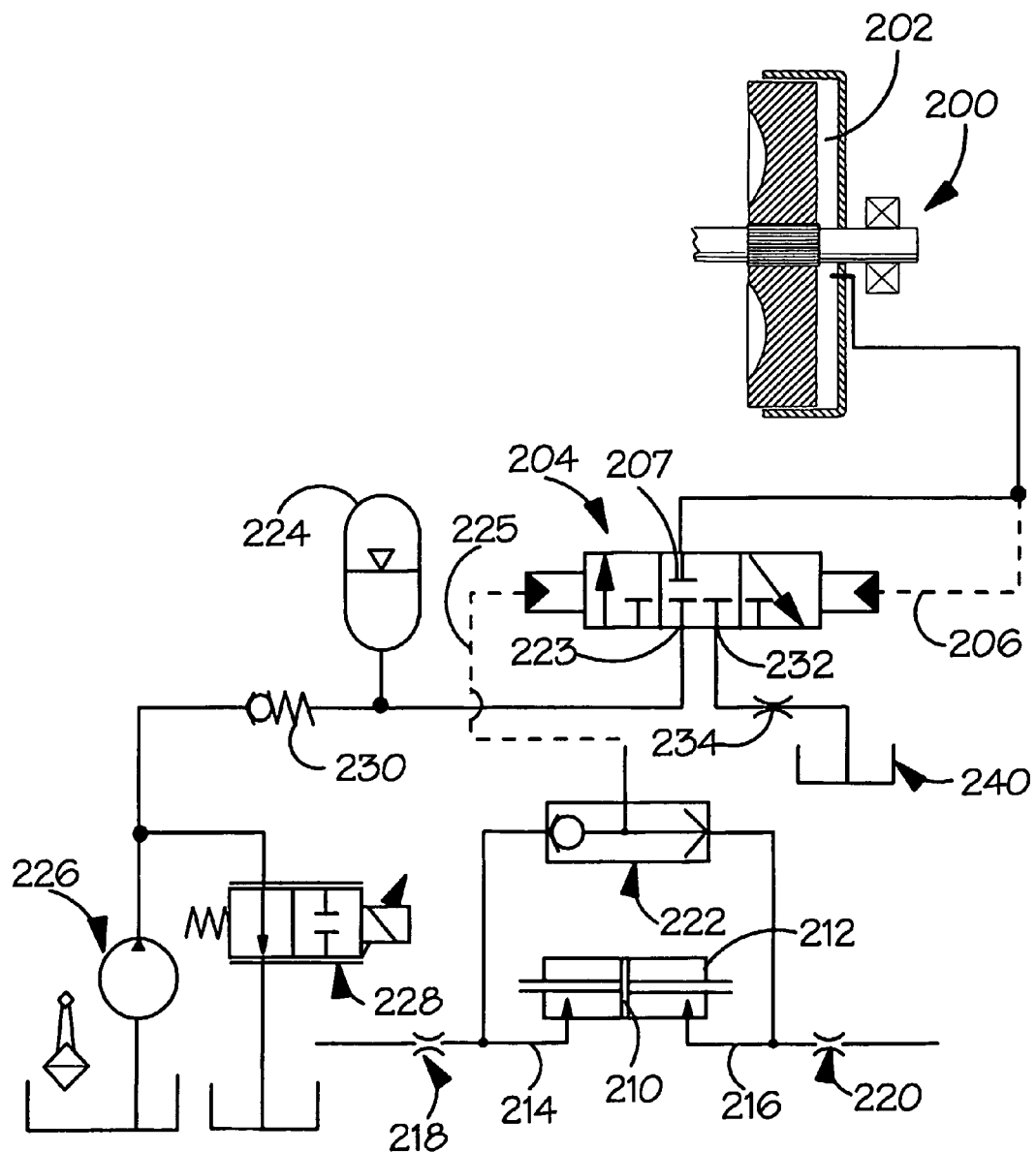
FIGS. 2 to 7 are schematic representations of further control circuits embodying certain features of the present invention.

FIGS. 2 to 10 illustrate various further variator control circuits in a more schematic form, only those components directly related to end load control being included. The same reference numerals are used throughout FIGS. 2 to 10 to indicate certain common components. Refer firstly to FIG. 2 which includes all such numerals. The end load actuator is seen at 200 and as before has a working chamber 202 supplied with fluid at an operating pressure through a shuttle valve 204 formed as a double pilot operated directional control valve which in each case receives a hydraulic pilot signal representative of the end load operating pressure. In each of the embodiments illustrated in FIGS. 2 to 10 this is provided through a passage 206 which is additionally connected to a first port 207 of the shuttle valve and to the working chamber 202. FIGS. 2 to 10 all show only a single representative roller control piston 210, shown schematically in these illustrations within a cylinder 212 to form a double acting arrangement, opposite faces of the piston 210 receiving hydraulic fluid through respective branches 214, 216 corresponding to the branches 25, 25a of the FIG. 1 circuit. Those components of the hydraulic circuit used to generate adjustable pressure in the branches 214,216 in order to control the roller reaction force are omitted from FIGS. 2 to 10, but may be as in FIG. 1. The branches 214, 216 incorporate respective flow restrictions 218,220 whose function is to provide damping of roller motion. A higher pressure wins valve arrangement 222 has respective inputs connected on either side of the representative roller control cylinder 212. These connections are formed between the cylinder and the respective restrictors 218,220, in order that the valve arrangement 222 can pass on, through a conduit 225, the higher of the reaction circuit pressures with minimal time lag to serve as a second pilot pressure signal acting on the shuttle valve 204 and opposing the signal representing the end load pressure. In each of FIGS. 2 to 10, and similarly to the FIG. 1 embodiment, a second port 223 of the shuttle valve 204 is connected to a high pressure fluid source comprising a hydraulic accumulator 224 which is maintained at the required pressure by means of a pump 226, a relief valve 228 and a non return valve 230 in a manner with which the person skilled in the art will be familiar.

The circuits illustrated in these drawings differ from each other, among other things, with regard to the connection of the shuttle valve's third port 232. In each case however the shuttle valve 204 is a three position valve which serves, in its different positions, to:— i. isolate each port from the other, as in the position shown in the drawings;

ii. connect the first and second ports 207, 223 to deliver hydraulic fluid pressure from the accumulator 224 to the working chamber 202 of the end load actuator 200; or iii. connect the first and third ports 207, 232 to connect the end load working chamber 202 to some part of the circuit serving as a pressure sink.

In all of these circuits the path to the pressure sink incorporates a flow restrictor 234 whose function will be described below.

Looking now specifically at FIG. 2, it can be seen that the third port 232 of the shuttle valve 204 is connected through the flow restrictor 234 to a drain leading to the sump 240. There is no provision for connecting the reaction circuit pressure to the end load working chamber 202, as in the FIG. 1 circuit. Nonetheless the reaction circuit pressure does have a controlling influence on the end load pressure since the shuttle valve 204 serves to compare the two pressures, due to its pilot inputs. If the reaction circuit pressure overcomes the end load pressure, indicating that the end load is insufficient, then the valve 204 shuttles to position (ii) referred to above (spool in its right-most position) to connect the accumulator 204 to the end load actuator 200 and so increase the end load, until the required pressure is achieved at which point the valve shuttles back to position (i) to maintain end load at a steady level. If on the other hand reaction circuit pressure falls to a sufficiently low level relative to the end load pressure then the valve shuttles to position (iii) allowing discharge of the end load working chamber 202 through the flow restrictor 234, until once more the end load and reaction circuit pressures acting on the shuttle valve 204 balance such as to allow it to return to position (i).

The flow restrictor 234 controls the end load decay rate, ensuring good end load fraction during repeated transients and imposing a limit on the flow required from the accumulator 224 no matter how high the frequency of disturbance to the system. Above a certain frequency of excitation, the end load simply remains high. In between the steady state condition and the infinite frequency case lies a maximum mean accumulator flow, occurring at a certain frequency and magnitude of pressure disturbance. The capacity of the high pressure fluid source 224, 226 can be selected on this basis.

Note that the comparison between the end load and reaction circuit pressures, effected by the shuttle valve 204 in this exemplary embodiment, can be weighted. The areas of the valve's spool subject to the two pilot pressures need not be equal, and the ratio of one to the other can be used to set the traction coefficient. Also the valve's spool is typically biased, eg. by mechanical springing.

Figure 3:
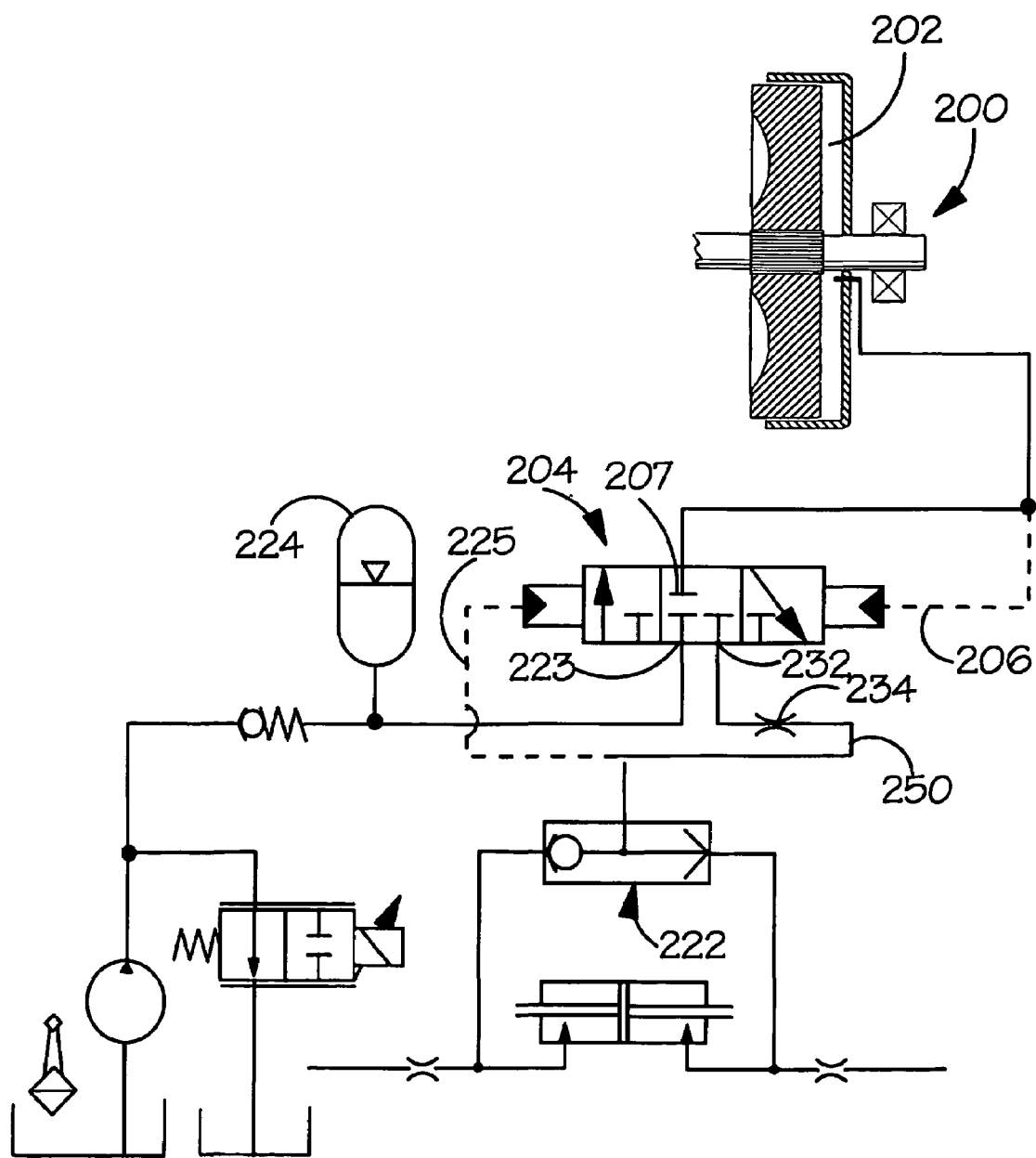

The circuit illustrated in FIG. 3 differs from that of FIG. 2 in that the pressure sink is provided by means of a conduit 250 leading from the flow restrictor 234 to the higher pressure wins valve arrangement 222 and hence to the higher pressure side of the roller control circuit.

Figure 4:
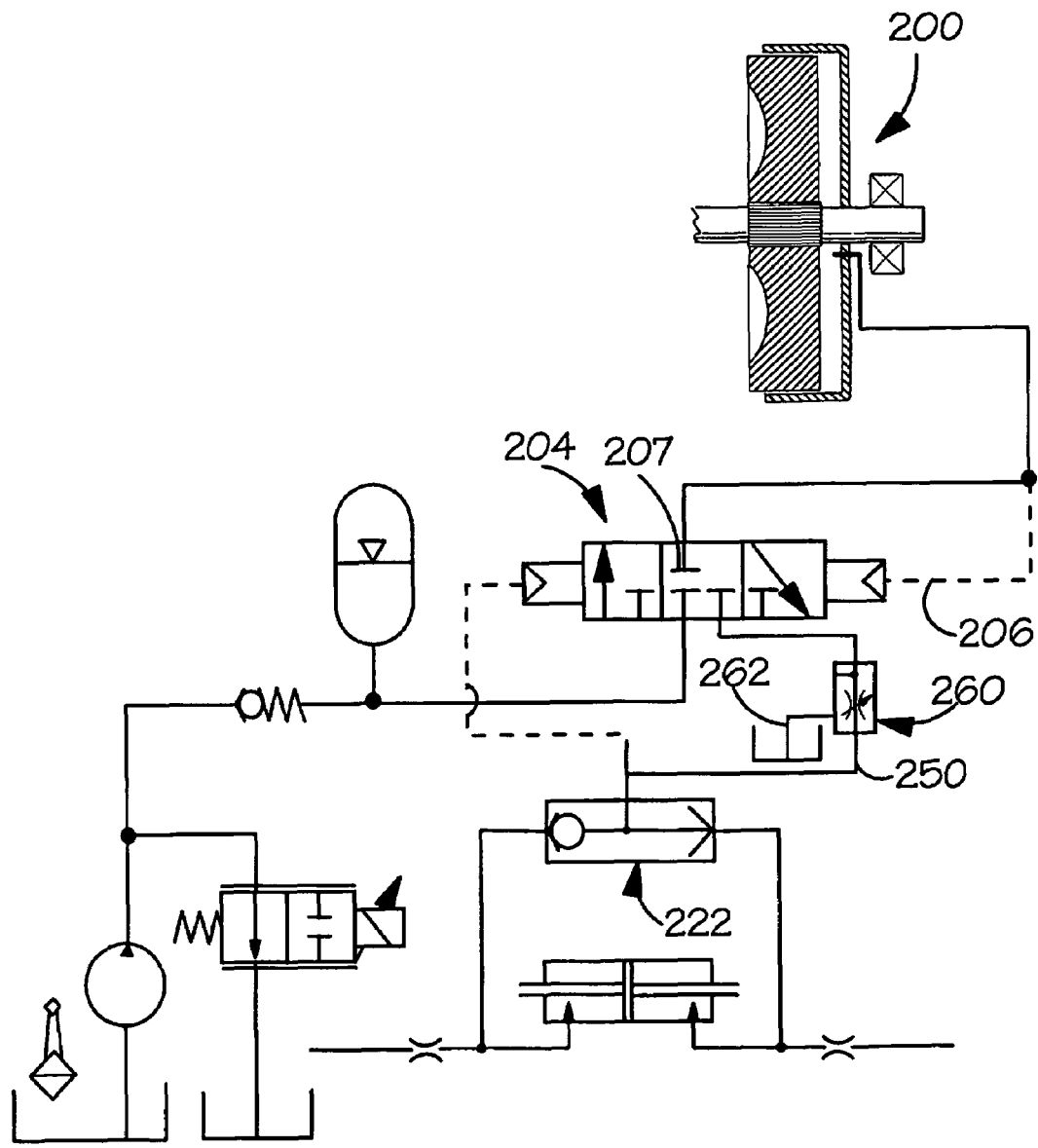

The circuit illustrated in FIG. 4 corresponds to the FIG. 3 circuit except that a flow control (regulating) valve 260 is used in the route to the pressure sink (again, provided through conduit 250 leading to the roller control circuit through the valve arrangement 222) in place of the flow restrictor 234. The flow control valve 260 controls the rate of end load discharge and sends a regulated flow through the conduit 250 to the roller control circuit, most of the end load discharge flow typically being dumped by the valve 260 to the sump through a dump passage 262. This prevents the reaction circuit pressure from being disrupted when the end load discharges.

Figure 5:
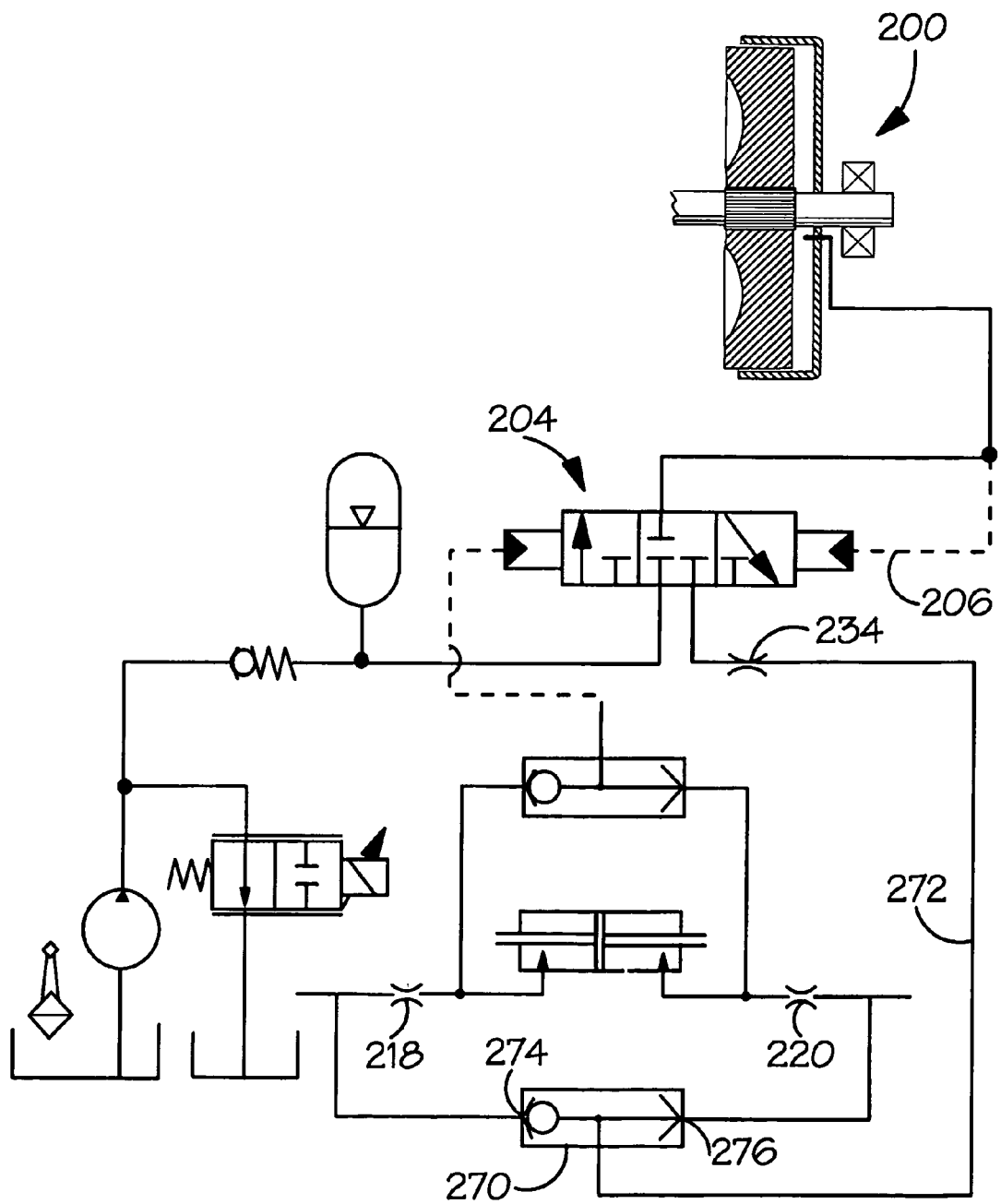

The circuit illustrated in FIG. 5 differs from that of FIG. 3 in that end load discharge is provided for by means of a further higher pressure wins valve arrangement 270 which receives the discharge fluid through a conduit 272 leading from the flow restrictor 234 and delivers it, through whichever of its outlets 274, 276 is at higher pressure, to the main roller control circuit, outboard of the relevant roller flow restrictor 218, 220.

Figure 6:
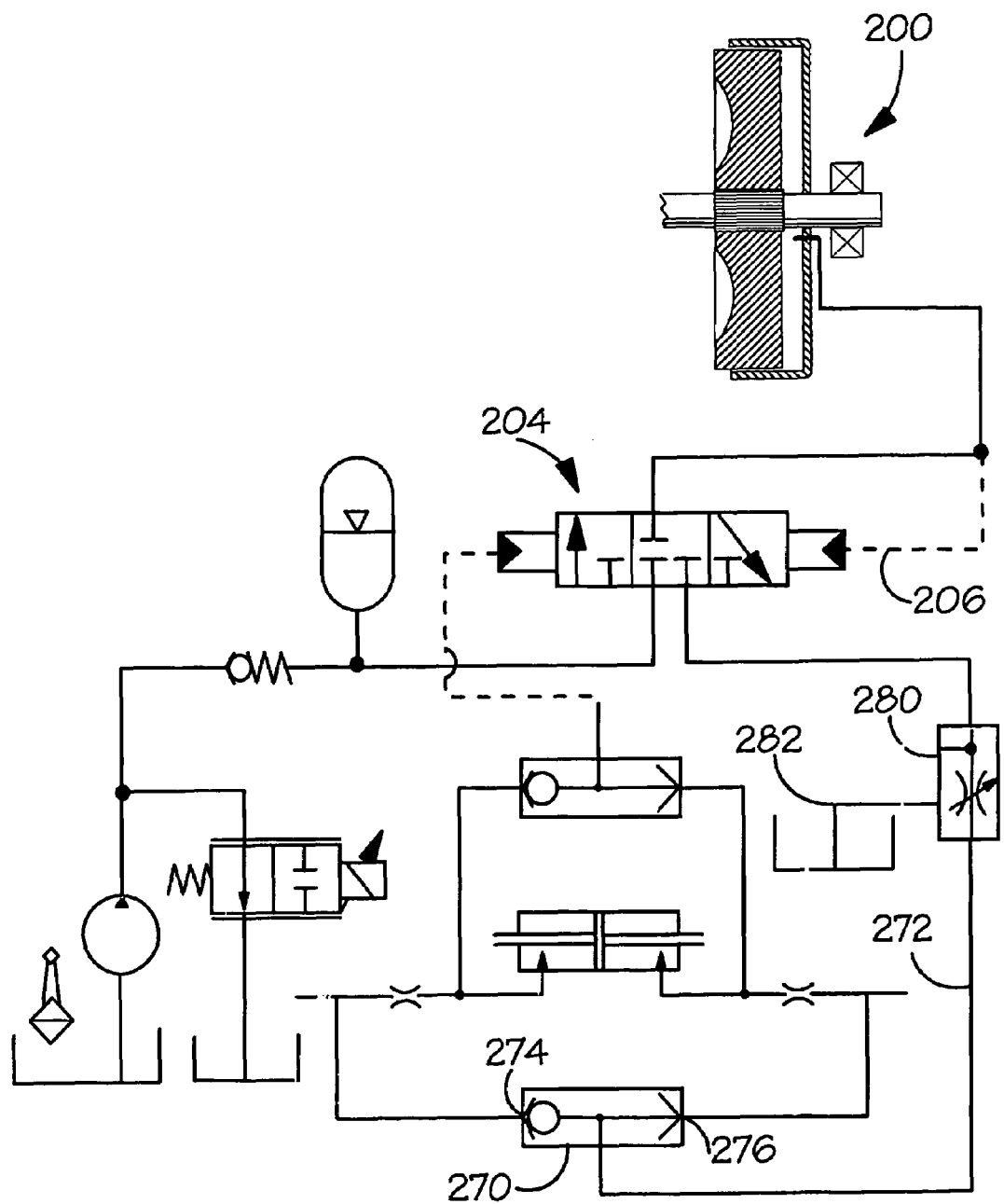

FIG. 6 illustrates a development of the circuit illustrated in FIG. 5, the difference between the two circuits being that the flow restrictor 234 of FIG. 5 has been replaced by a flow control valve 280. This performs a similar role to valve 260 of the FIG. 4 circuit, controlling the rate of end load discharge and sending a regulated flow back to the reaction circuit during discharge, the remainder of the flow being dumped to the tank through dump passage 282. This prevents disruption of roller control circuit pressure upon end load discharge.

Figure 7:
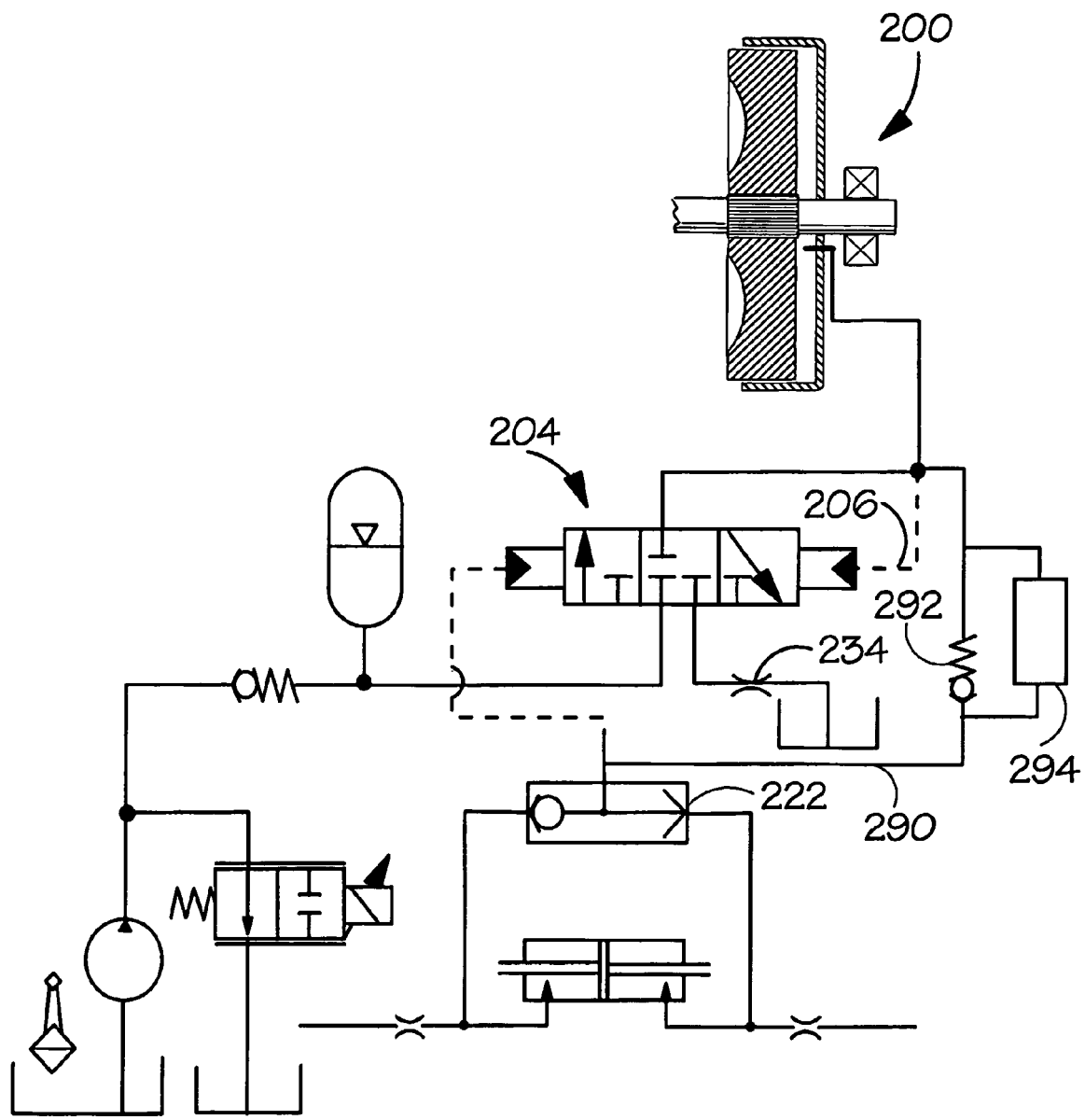

FIG. 7 illustrates a fail safe feature which may be added to any of the illustrated circuits. A back-up conduit 290 conducts the higher reaction circuit pressure from the higher pressure wins arrangement 222 to a normally closed check valve 292, connected in its turn to the end load actuator 200. If for any reason (eg. malfunction of the circuit) the end load should fall to an unacceptably low level relative to reaction pressure, which could otherwise create a danger of inadequate end loading leading to variator traction failure, then the check valve 292, is caused to open providing a low resistance path for the end load to be charged from the reaction circuit. An operational sensor 294, formed in this embodiment as a differential pressure switch, would then indicate to the transmission's electronic control (PCU) that the problem had occurred, enabling appropriate control to be implemented to protect the transmission, and in some embodiments providing the driver with a warning signal.

Figure 8:
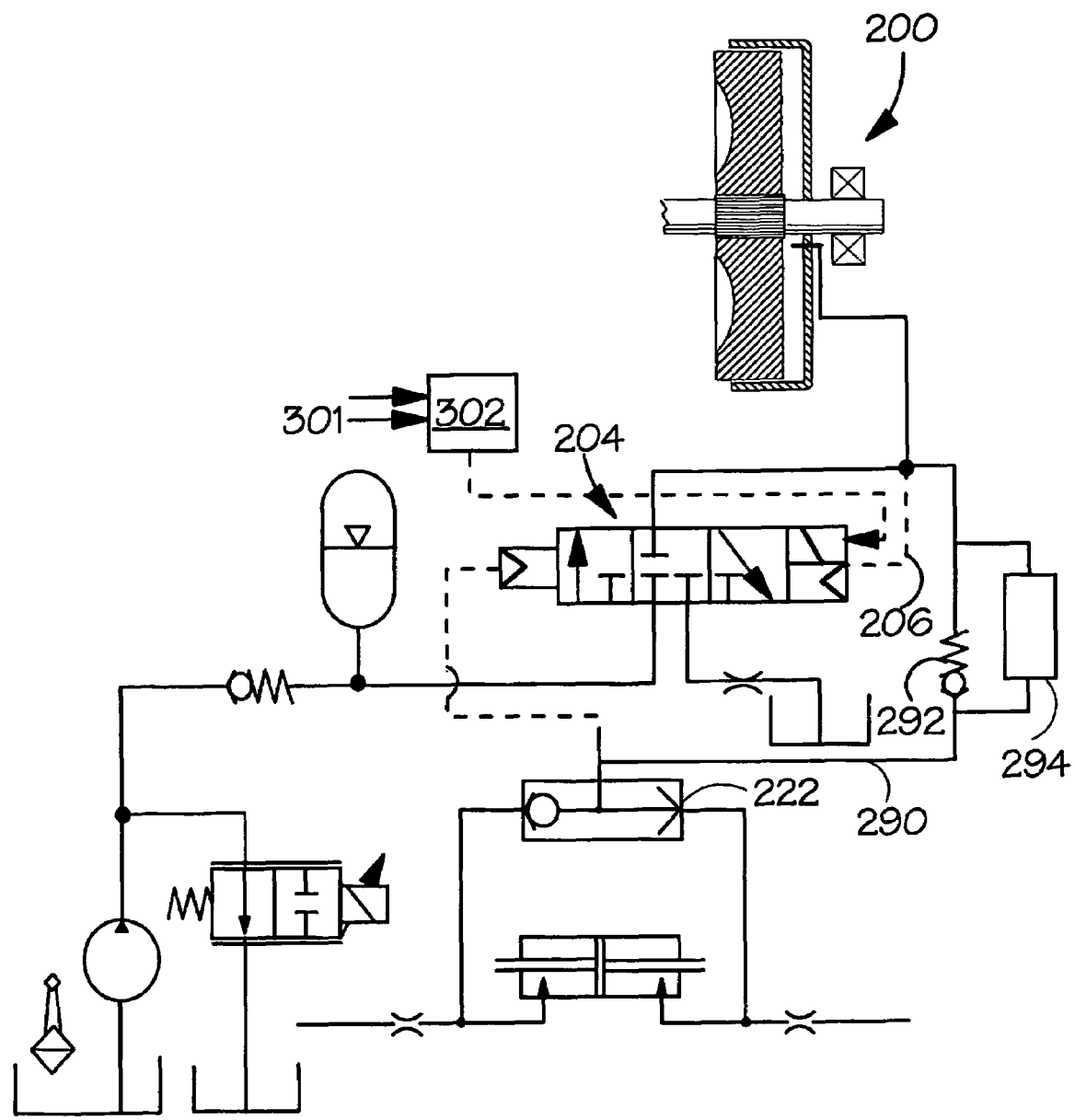
FIGS. 8, 9 and 10 are schematic representations of still further control circuits, which embody the present invention.
Figure 9:
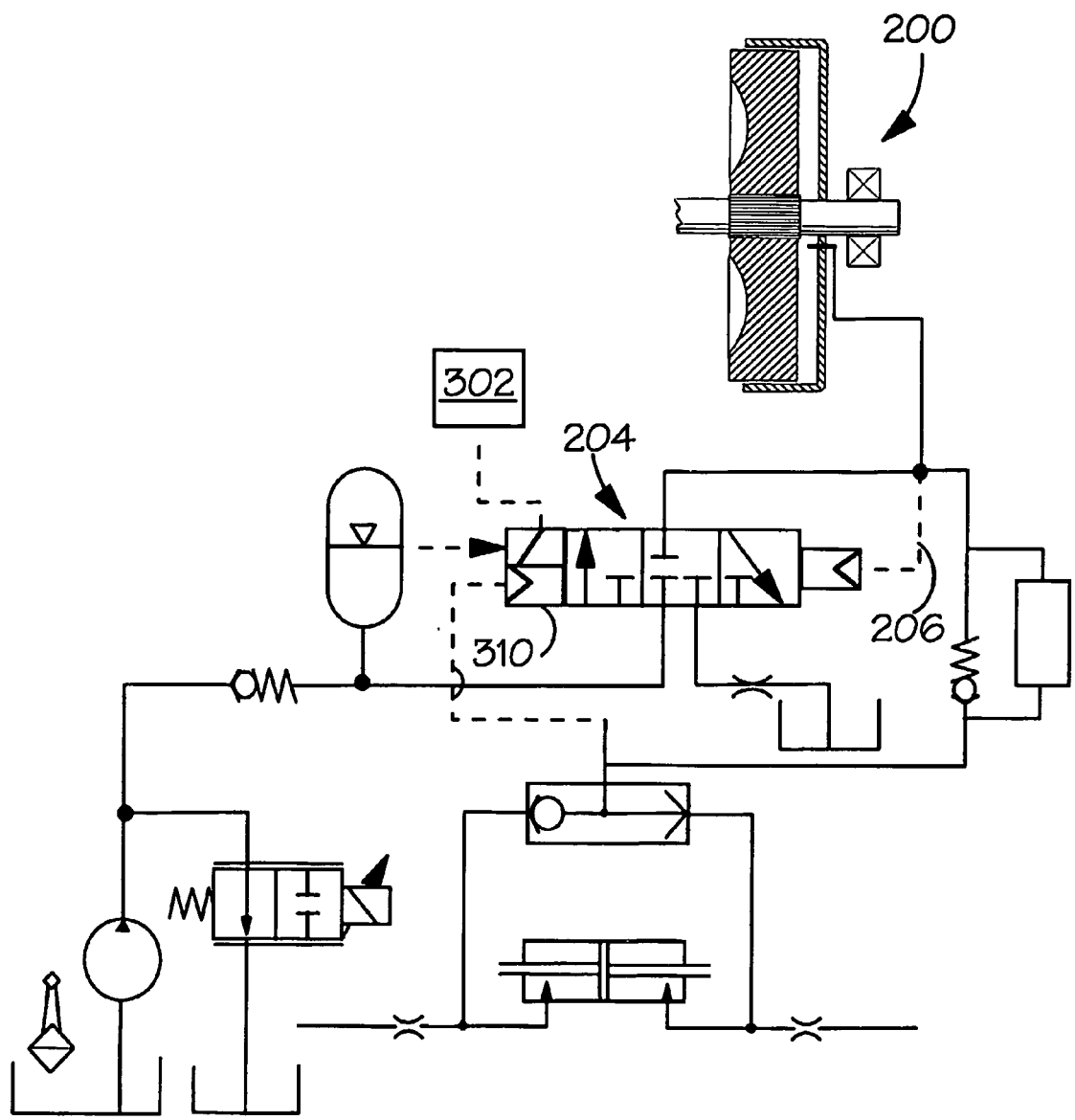

While the embodiments described above allow rapid and effective end load control, addressing the end load time lag problem which has already been discussed, it has yet to be explained how they may be adapted to permit adjustment of the relationship between reaction circuit pressure and end load, and hence adjustment of the variator traction coefficient. FIGS. 8 and 9 illustrate embodiments in which provision is made to effectively "weight" the comparison of reaction circuit and end load pressures, thereby adjusting the relationship between the two pressures and hence the traction coefficient which is achieved. In the illustrated embodiments, utilising the shuttle valve 204 to carry out this comparison, the weighting is effected by means of adjustable biasing of the shuttle valve spool, providing what is in effect a further control input thereto. This approach can be applied to any of the previously described circuits, as will be apparent from the following.

The circuit illustrated in FIG. 8 corresponds to that of FIG. 7 except that a solenoid 300 acts on the spool of the shuttle valve 204 such as to apply an adjustable biasing force thereto, urging the spool toward the end load discharge position (iii)—i.e. to the left, in the drawing. The magnitude of the biasing force is controlled by the transmission's PCU 302. The shuttle valve 204 thus adopts the end load charge position (ii) only when the reaction circuit overcomes the sum of the end load pilot force and the solenoid biasing force. This feature thus enables the PCU to introduce an adjustable negative offset on the end load level in order to increase traction coefficient to an optimal level, thereby potentially increasing efficiency. This control can be carried out in dependence upon measured operating parameters such as operating temperature or indeed prevailing variator roller positions, received by the PCU as inputs 301.

This mode of traction coefficient control may be referred to as "subtractive" since the additional, variable input to the shuttle valve 204 provided by the solenoid 300 serves to reduce the end load. This has the benefit of being fail safe in the event of failure of the solenoid 300. If the solenoid fails, applying no biasing force, the effect is to increase the end load which reduces efficiency but still provides adequate end load for variator function, enabling the vehicle to "limp home".

In FIG. 9 a solenoid 310 is provided which biases the shuttle valve 204 in the direction (opposite to the direction of action of solenoid 300) toward the accumulator charge position (ii). Hence the valve only shuttles from the accumulator charge position when the end load pilot force is sufficient to overcome the sum of the reaction pressure pilot force and the biasing force applied by the solenoid 310. Again the solenoid's biasing force is controlled by the PCU 302 which can therefore set a positive offset on the end load level. This "additive" control can again be used to adjust the traction coefficient to provide efficiency improvements.

It will be apparent that any of the shuttle valves 204 of the circuits illustrated in FIGS. 1 to 7 may receive an additional control signal, e.g. from a solenoid such as 300 or 310, to enable traction coefficient adjustment in accordance with the present invention.

The skilled reader will recognise that the function of the shuttle valve 204 can be put into practice in a variety of ways. For example, it is desirable not to directly secure the solenoid 302 to the valve spool since the solenoid is relatively massive and the valve's speed of response would consequently be impaired. A more practical alternative is to couple the solenoid and spool through a spring, so that the solenoid serves to apply an adjustable mean force to the spool. A further alternative is to have the solenoid, or some other actuator, adjust the position of a sleeve of the valve 204 defining the valve's ports in order to provide the required offset.

Figure 10:
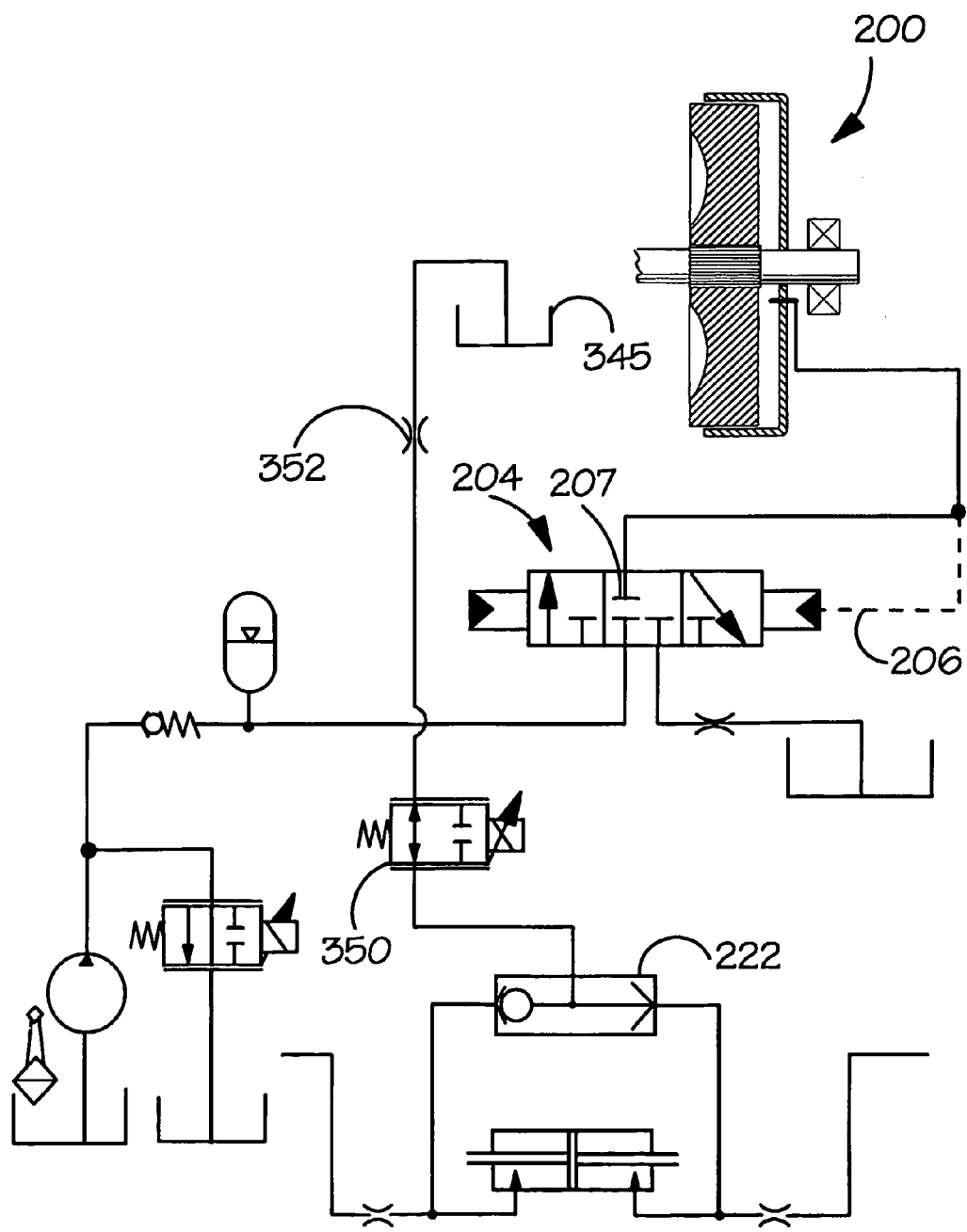

The function of the solenoids 300, 310 is, as will be apparent, to adjust the relationship between the end load pressure and the reaction circuit pressure. Such adjustment may however be achieved in other ways. One alternative is illustrated in FIG. 10. As in earlier circuits the pressure supplied to the working chamber 202 of the end load actuator 200 is controlled by the three position shuttle valve 204 whose spool is influenced by a first pilot pressure signal from connection 206 to the working chamber 202 and by an opposed, second pilot pressure signal derived from the higher pressure wins arrangement 222. However in the FIG. 10 circuit this second pilot pressure signal is adjustable. Instead of being led directly to the spool of the shuttle valve 204, the output of the higher pressure wins arrangement 222 is connected through a series combination of first and second flow restrictors 350, 352 to drain. The second pilot pressure signal is taken through a conduit 354 connected to a point between the first and second flow restrictors 350, 352, one of which provides a variable restriction under control from the PCU 302. In FIG. 10 this function is carried out by the first flow restrictor 350 which takes the form of an electronically controlled valve.

The first and second flow restrictors function analogously to a potential divider in an electronic circuit. A pilot flow passes continuously through the restrictors, this flow being small enough not to significantly alter the reaction pressure obtained from the higher pressure wins arrangement 222.

In flowing from the higher pressure wins arrangement to the tank (here labelled 354, and of course being at atmospheric pressure) the fluid experiences a total pressure drop equal to the reaction circuit pressure. Neglecting flow resistance in the intervening conduits, this pressure drop takes place across the two flow restrictors 350, 352. The ratio of the pressure drop $\Delta P_1$ across first restrictor 350 to the pressure drop $\Delta P_2$ across second restrictor 352 is determined by the resistance to flow of the two restrictors and (while the valve forming the first restrictor 350 is not adjusted) is largely constant regardless of changes in flow rate with variations in reaction circuit pressure. Adjusting the restrictor 350, however, allows the ratio of $\Delta P_1$ to $\Delta P_2$ to be correspondingly adjusted.

Consequently an adjustable fraction of the reaction circuit pressure is applied to the shuttle valve 204 to serve as the second pilot pressure signal. Hence by controlling the variable restrictor 350, the relationship between the end load and the reaction circuit pressure can be adjusted.

Figure 11:
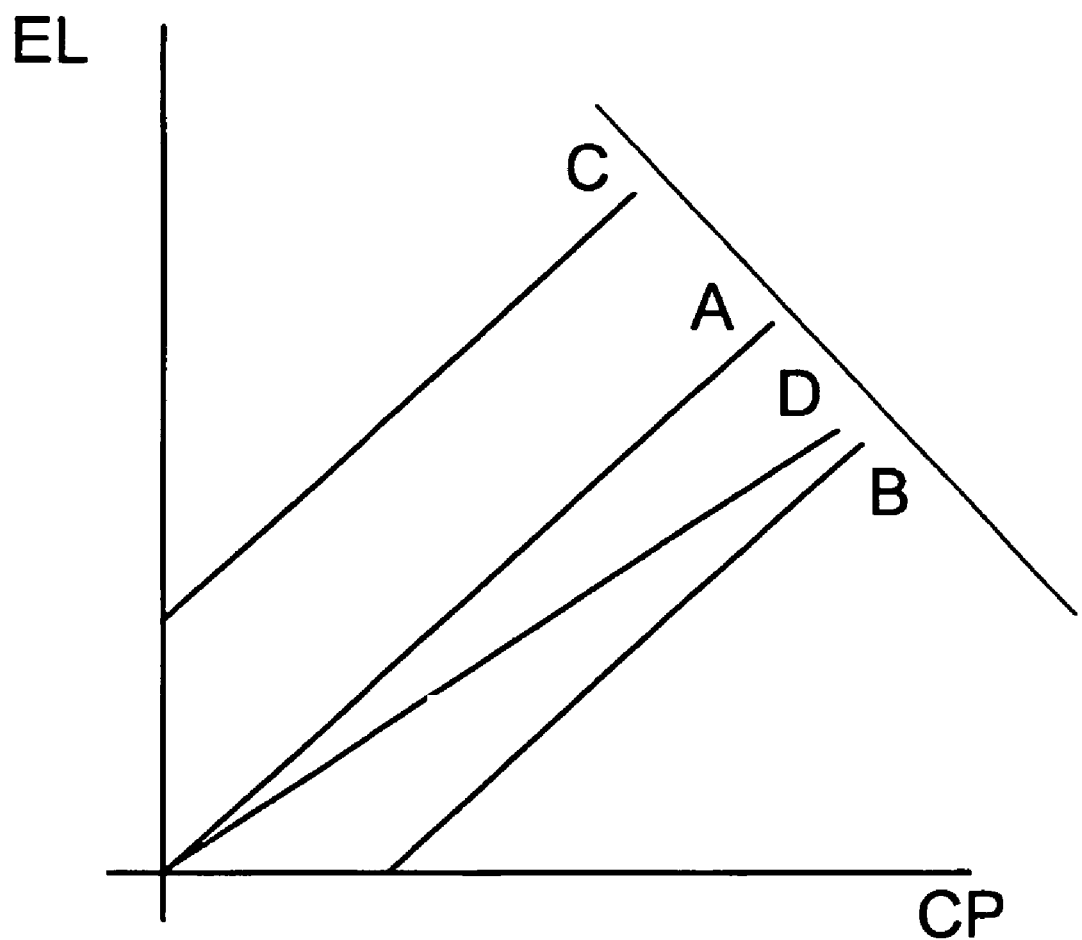
FIG. 11 is a graph illustrating operation of the invention.

Whereas FIGS. 8 and 9 are concerned with "subtractive" and "additive" adjustment of this relationship, FIG. 10 shows a way to achieve what may be referred to as "multiplicative" adjustment. FIG. 11 is a graph intended to make this distinction clear, reaction circuit pressure (or equivalently variator reaction torque) CP being shown on the horizontal axis against end load EL on the vertical axis. The straight line A indicates the (idealised) relationship between these two variables created by use of the shuttle valve 204 in the absence of adjustment by solenoids 300, 310 or by variable restrictor 350.

The ratio of end load to reaction circuit pressure is constant. To put this another way, neglecting the cosine factor referred to above, the straight line A corresponds to a constant traction coefficient. Straight line B shows the effect of subtractive adjustment of end load as effected by the FIG. 8 circuit. The gradient of the line relating reaction and end load pressures is unchanged but the line is offset vertically, no longer passing through the origin. Consequently there is no longer a constant ratio of one pressure to the other. The traction coefficient thus varies with changes in reaction circuit pressure. Line C shows an additive adjustment, again with a non-constant traction coefficient. Line D on the other hand shows a multiplicative adjustment carried out by the FIG. 10 circuit. The gradient differs from line A but the line still passes through the origin, indicating that the effect of the adjustment is to change the traction coefficient to a new value which is nonetheless constant notwithstanding changes in the reaction circuit pressure.

The circuits illustrated in FIGS. 8, 9 and 10, it will be understood, utilise the hydraulically controlled shuttle valve to maintain a relationship between end load and reaction pressures. Being hydraulically controlled the valve can have a quick response time and so react with sufficient rapidity to maintain adequate traction even during rapid "transients" such as in the event of rapid vehicle braking or acceleration, which briefly create very high variator torque demand. The solenoid 302 or the restrictor valve 350, serving to adjust this relationship, are electronically controlled and consequently slower in responding but the required adjustment (corresponding e.g. to fluid temperature) can be more slowly carried out without impairing variator function.

The invention claimed is:

1. A variator assembly comprising a toroidal-race rolling-traction variator having input and output discs, rollers which are acted on by hydraulic roller control actuators and are positioned between the discs to transmit torque from one disc to the other, a hydraulic end loading device supplied with fluid at an end load pressure to apply an end load to bias the discs and the rollers toward each other, thereby enabling the transmission of torque, and a reaction pressure supply connected to the roller control actuators to cause them to apply an adjustable reaction force to the rollers, the assembly further comprising a hydraulically influenced valve arrangement which serves to make a comparison of an input related to the end load pressure with an input related to the reaction pressure and to control the end load pressure in dependence upon the comparison, thereby maintaining a relationship between the end load and reaction pressures, and an adjustment device which serves to adjust a signal applied to the valve arrangement and thereby to adjust the relationship between the end load and reaction pressures, the adjustment device being controlled by an electronic controller in response to measured operating parameters.

2. The variator assembly of claim 1 wherein an effect of the adjustment device is to reduce the end load pressure so that in the event of inaction of the adjustment device, the end load pressure is increased.

3. The variator assembly of claim 1 wherein the valve arrangement comprises a pilot operated valve receiving a hydraulic reaction pressure input signal taken from a connection to the reaction pressure supply.

4. The variator assembly of claim 1 wherein the roller control actuators are double acting and are connected to first and second reaction pressure supplies, the pressures from which oppose each other in determining the force applied to the rollers, a further valve arrangement being connected across the first and second supply means to direct the higher of the two pressures to the valve arrangement.

5. The variator assembly of claim 1 wherein the valve arrangement is arranged to receive as a further input an end load adjustment signal from the adjustment device and to modify the end load pressure in response thereto.

6. The variator assembly of claim 5 wherein the valve arrangement comprises a valve spool and the adjustment device comprises an actuator for applying an adjustable biasing force to the valve spool.

7. The variator assembly of claim 6 wherein the actuator is coupled to the valve spool though a spring member.

8. The variator assembly of claim 1 further comprising a pressure modifying arrangement which receives as an input pressure one of the reaction pressure and the end load pressure, which modifies this pressure to create an output pressure which is a function of the input pressure and which applies the output pressure to the valve arrangement.

9. The variator of claim 8 wherein the pressure modifying arrangement comprises two restrictors which are connected in series and though which the input pressure is led to a pressure sink, one of the restrictors being variable and the output pressure being taken from between the two restrictors.

10. The variator assembly of claim 8 wherein the input pressure to the modifying arrangement is the reaction pressure.

11. The variator assembly of claim 3 wherein the valve arrangement has at least two states in which it serves to connect the end loading device respectively to (1) a high pressure fluid source and (2) a pressure sink.

12. The variator assembly of claim 11 wherein the valve arrangement has a further state in which it serves to isolate the end loading device.

13. The variator assembly of claim 11 wherein the pressure sink comprises a drain at atmospheric pressure.

14. The variator assembly of claim 11 wherein the pressure sink comprises a connection to the reaction pressure supply means.

15. The variator assembly of claim 11 wherein the connection to the pressure sink is through a flow restrictor serving to limit throughput of fluid of the valve means.

* * * * *